Nov. 5, 1940.　　　　K. B. BLODGETT　　　　2,220,860
FILM STRUCTURE AND METHOD OF PREPARATION
Original Filed June 11, 1937
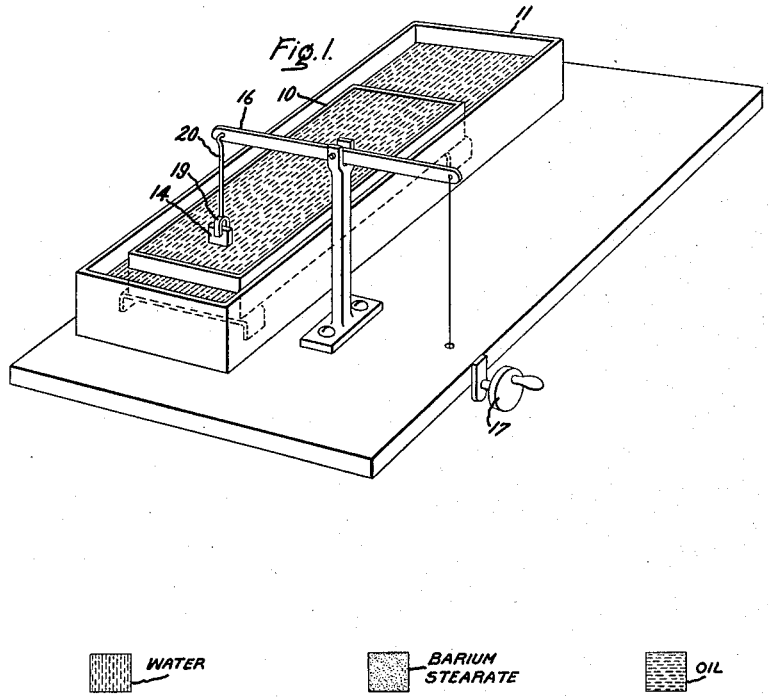
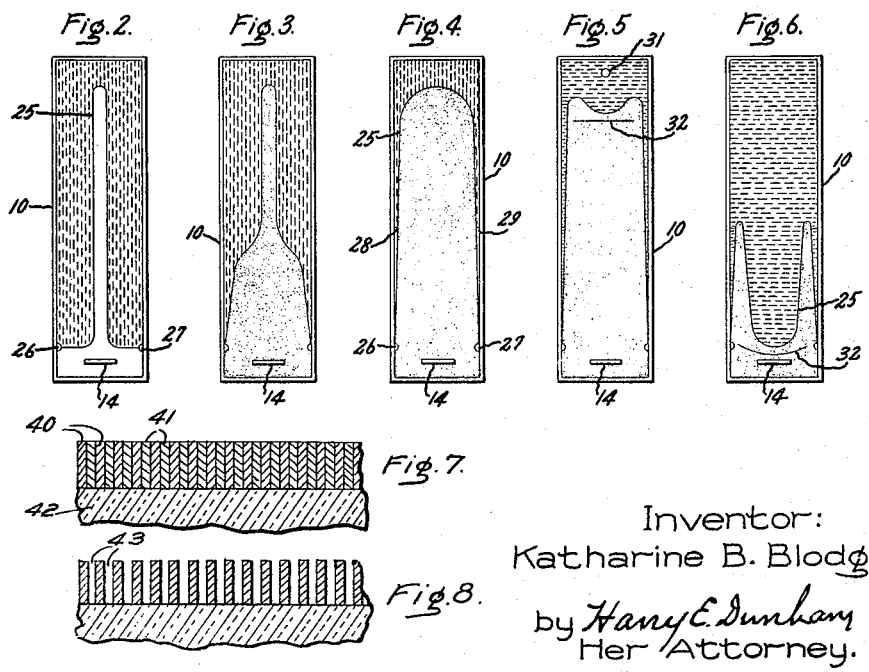
Inventor:
Katharine B. Blodgett,
by Harry E. Dunham
Her Attorney.

Patented Nov. 5, 1940

2,220,860

UNITED STATES PATENT OFFICE 2,220,860

FILM STRUCTURE AND METHOD OF PREPARATION

Katharine B. Blodgett, Schenectady, N. Y., assignor to General Electric Company, a corporation of New York Original application June 11, 1937, Serial No. 147,697. Divided and this application March 16, 1938, Serial No. 196,234

6 Claims. (Cl. 88—14)

This is a division of my prior application S. N. 147,697, filed June 11, 1937 and assigned to the General Electrical Company.

The present invention has to do with the utilization of certain types of stratified films comprising a plurality of monolayers. The term "monolayer" as used herein is employed in its current sense. Loosely defined, it designates a single layer or stratum of atoms or molecules, such layer being characterized by a uniform thickness of molecular magnitude. Where the constituent elements of a monolayer are unsymmetrical molecules, they are ordinarily "oriented" in the sense of being similarly directed with respect to a given reference axis.

The novel features which I desire to protect herein will be pointed out with particularity in the appended claims. The invention itself, together with further objects and advantages thereof will best be understood by reference to the following description taken in connection with the appended drawing, in which Fig. 1 is a perspective view of an apparatus suitable for preparing stratified films of the type in question, Figs. 2 to 6 are plan views of the same apparatus showing it in various conditions of use, and Figs. 7 and 8 are greatly enlarged views of a fragmentary portion of a film embodying the invention as the same is imagined to appear in two different conditions of use.

In my aforementioned application S. N. 147,697 a procedure is explained by means of which one may build up on a base member a determinable number of superimposed monolayers forming a stratified film having very definite and reproducible optical properties. Films so constituted are highly uniform as to surface characteristics and may be built up to have a thickness which is controllable within extraordinarily narrow limits, for example, within one ten millionth of an inch. Because of the accuracy with which their thickness may be controlled, it is practical to use the films as color standards, as standards for minute thickness measurements, and as devices for the detection of very minute quantities of material substances. These uses depend primarily upon the optical properties of the films, although others of their properties may also be utilized. Before proceeding to a full exposition of my invention, I shall first describe in exemplary fashion one mode of film production.

One may form on the surface of a base member a film built up of monolayers by depositing such layers from the surface of a body of a liquid working medium on which a single layer has been preliminarily developed. The base member may comprise a solid plate or block having a smooth, at least partially reflecting, surface. Examples of satisfactory materials include glass and polished chromium.

Apparatus suitable for film deposition is shown in Fig. 1 in which I have illustrated a trough 10 adapted to contain water or a similar working medium. In order that the temperature of this trough may be accurately controlled, it is surrounded by an attemperating liquid retained in a tray 11.

For making one type of film the trough 10 is filled to the brim with water which contains a soluble barium salt such as barium acetate, and which is further modified by the addition of a small amount of stearic acid dissolved in benzene. The stearic acid spreads rapidly over the surface of the water in a monolayer, and if the pH of the water bath is properly adjusted will be converted into barium stearate by reaction with the barium salt. The benzene evaporates in a very short time. In the use of the trough 10 its edges and inner surface are preferably coated with paraffin wax for the purpose of preventing water from flowing over the edges and from dissolving foreign substances from the inner surface of the trough.

In order to coat a base member with a film of the type in question such base member may be successively raised and lowered through the surface of the film-covered water, as explained in the following:

In the arrangement illustrated in Fig. 1 I have shown a base member 14 arranged to be raised and lowered by means of a lever 16 operated by a hand windlass 17. A clamp 19 at the lower end of a suspension member 20 may be utilized for holding the base member. A mechanical arrangement of this sort makes it possible to move the base member slowly and smoothly without any backward or "hitching" motion.

The base member 14 is first preferably cleaned thoroughly and thereafter raised and lowered through the surface of the water in the trough. The clamp holds the base member faced in such a direction that the surface on which the films are to be deposited is perpendicular to the water surface and to the length of the trough 10.

In order to obtain uniform deposition of the film, certain precautions must be taken with respect to maintaining the film as it exists on the water surface in a proper physical state. Specifically, it is necessary to maintain some sort of lateral pressure on the boundaries of the film to maintain its integral nature. This may be done in one way by the arrangements illustrated in Figs. 2 to 5 inclusive. In Fig. 2 I have illustrated the tray 10 as viewed from above, showing the base member 14 near one end of the tray and enclosed within the bight of a waxed silk thread 25 which floats on the surface of the water. It will be noted that the extremities of the thread are secured to the walls of the trough at 26 and 27. Also within the bight of the thread 25 there is contained the film of barium stearate formed as previously described herein.

Fig. 2 shows the usual condition of the thread before the stearic acid has been added to the water surface. After its addition the spreading of the acid into a monomolecular film causes an expansion of the silk thread as indicated in Figs. 3 and 4. After the spreading has reached its maximum the thread is fastened to the edges of the tray 10, for example, by means of clips applied at 28 and 29. Finally, a tiny drop of oil (for example, oleic acid) is placed on the water surface at 31. This oil breaks up into many tiny lenses surrounded by a monomolecular film which presses against the outer boundary of the barium stearate and causes it to contract slightly in area as is shown in Fig. 5. In this operation the thread 25 exerts no pressure, but is used only to make the boundaries of the films visible to the eye. As soon as the barium stearate has contracted to an area at which the pressure within the bight of the silk thread equalizes the external pressure due to the oil, spreading of the oil ceases. Another thread indicated at 32 may then be laid in the position shown to act as a further barrier, so that if any of the oil accidentally passes the thread 25, it will remain in the area between 25 and 32.

With these preliminary measures taken, one may proceed to the process of depositing layers of barium stearate on the base member 14 (which has preferably been positioned below the water surface before the film is formed). This may be accomplished by raising and lowering the lever 16 to cause the base member successively to enter and leave the surface of the water. The precise nature of the film which will be deposited in this way is determined in part by the pH of the water. With a pH of less than about 8.0 the alternate monolayers deposited are of unlike character in that the orientation of the molecules is reversed from layer to layer. By simply continuing to raise and lower the base member through the surface of the water bath any number, say several hundred, of monomolecular strata or layers may be built up, thus producing a film of any desired thickness. As barium stearate is adsorbed from the surface of the water bath, the contour of the silk thread 25 will change as shown in Fig. 6.

Under somewhat different conditions, particularly with an increase in the pH of the water bath above about 8.0, films of a different type may be deposited. With such pH values the first several layers deposited may have the alternating characteristic previously described. However, after a certain thickness, corresponding to about 10 or more layers, has been attained, the film commences to slip on the ascent of the base member; that is, it fails to attach itself to the base member as the member rises through the water surface. However, as the base member is lowered into the water bath a monomolecular layer will be deposited. By lowering the base member through the surface of the water a sufficient number of times, a film of desired thickness may be developed.

It is an advantage of this method of film production that the two steps of raising and lowering the base member through the surface of the water bath result in the production of a single monomolecular layer. For this reason somewhat finer control of the film thickness may be achieved than is possible with films of a type in which raising and lowering the base member produces two layers as previously described.

With either of the methods described above each added layer is of extreme fineness, on the order of one ten-millionth of an inch, and the total film thickness may be made to fall within very narrow limits. It is one effect of this factor that as the film thickness is increased above a certain value (about 900 Angstroms) sharp variations in the appearance of the film as viewed by a given light source are observed. This is a result of interference effects occurring between light transmitted through the film and reflected from the base member and that reflected directly from the upper surface of the film.

It is not necessary herein to explain in detail the mechanism by which such interference is accomplished, since this is a matter which is well understood by those skilled in the optical arts. It is enough to say that interference occurs when the path difference between the transmitted and reflected light is such that at the point of recombination the two components are one-half wave length, or an odd number of half wave lengths out of phase. Depending on the type of light employed visible interference effects will ordinarily occur when the film thickness corresponds at least approximately to an integral member of quarter wave lengths of some monochromatic component of visible light. The term "an integral number of quarter wave lengths" as used herein and in the appended claims should be understood to include a single quarter wave length.

Other variables which affect the film thickness required to produce interference effects include the polarization and angle of incidence of the impinging light and the index of refraction of the film material and of the base member. With the former fixed by selection of a standard light source and the latter determined by the film material and the material of the base, the quality and amount of the interference effects obtained will depend directly on the thickness of the film.

Objectively the interference effect referred to will take the form of variations in the appearance of the film as viewed by a given light. Thus, as a film viewed by white light is increased in thickness, it will successively assume a yellow shade corresponding to the selective elimination by interference of blue light, a red shade corresponding to the elimination of green, a blue shade corresponding to the elimination of yellow, etc. If the same film is viewed by monochromatic light, say yellow light derived from a sodium vapor lamp, it will appear black when a thickness is attained appropriate to the elimination by interference of such monochromatic light.

A specific example of the phenomena discussed in the foregoing is afforded by a barium stearate film constructed in the manner hereinbefore described and viewed by white light. As the film thickness is increased, the film exhibits a series of brilliant interference colors corresponding to various film thicknesses. Specifically, when a multilayer barium stearate film is viewed at an angle of incidence of approximaly 80° by a white light which is polarized in a plane perpendicular to the plane of incidence, interference colors are produced corresponding to a first order spectrum. These colors are: yellow, 37 layers; orange, 39 layers; yellow-red, 41 layers; red, 43 layers; red-purple, 45 layers; blue-purple, 47 layers; deep blue, 49 layers, etc., shading to light blue at 57 layers. A different series of colors is obtained when 100–110 layers are added in steps to the basic film described above, the new sets exhibiting a second order spectrum. The second color series is different for the reason that second order interference colors do not match exactly the first order colors.

Another and different series may be observed when 85 to 105 layers or 190 to 210 layers are added to a base member and the resulting film viewed by light which is polarized in a plane parallel to the plane of incidence. Under these conditions the colors obtained represent the first and second order spectra for light polarized as stated. With either of the types of light referred to, further series may be obtained by adding additional monomolecular layers to attain higher orders of spectral colors.

Films built of layers of another substance than barium stearate such as barium arachidate have different thicknesses per layer from films of barium stearate and afford correspondingly different series of colors. Composite films may be built up of two or more substances in such a way as to give interference effects in any desired thickness range.

From the standpoint of utility, films having the characteristics above considered have many important aspects. For example, the colors exhibited by any of these films are so definite and so exactly reproducible as to constitute excellent color standards. Every part of the process of building up the films is readily standardized, so that the color exhibited by a given film when viewed by a standard light at a standard angle will afford a highly dependable basis of comparison with other colors desired to be evaluated in terms of the standard.

A further important use for these films consists in the measurement of particles of molecular dimensions which are capable of being adsorbed on the film surface. Thus, if a film as initially prepared exhibits a certain color when exposed to a standard light source, even a very slight increment to the film thickness will result in a color change which can be readily detected and evaluated in terms of the magnitude of the increment. For example, assume the existence of a prepared film of such thickness as to exhibit a yellow shade corresponding to the selective eliminating of blue light. If such a film is modified by the addition of a further layer of molecular dimensions applied either by the technique which I have described herein or by some other technique, a definite color change will take place, the nature of the color change being a direct indicium of the thickness of the added layer. Such thickness may be quantitatively determined, for example, by comparison of the color change with that produced by the addition of other monomolecular layers of known thickness.

Films intended for thickness measurement in accordance with the foregoing procedure may advantageously be of a thickness somewhat less than that appropriate to films used for color standards. This is due to the fact that it is desirable to have the addition of a monomolecular layer to bring the film thickness into the range of maximum interference effects. Consequently, I consider that from this standpoint the useful range of film thickness extends at least as low as about 700 Angstroms.

As a further aspect of the mode of utilization described in the foregoing paragraphs, the films of my invention may also be employed in detecting or verifying the suspected presence of minute quantities of material substances. For example, if one suspects the presence in a carrying medium of a substance having known molecular dimensions the actuality of such presence may be checked by the following technique. One may prepare a stratified film comprising a plurality of uniformly oriented monomolecular layers and having a thickness such as to produce predetermined interference effects when viewed by white or monochromatic light. More specifically, the prepared film should be of such thickness that the addition of a further monomolecular layer of dimensions corresponding to the known molecular dimensions of the suspected substance will produce a definitely predictable color change in the case of white light and an intensity change in the case of monochromatic light. If the prepared film is then exposed to the carrier medium in which the suspected substance is believed to exist and the same predictable color or intensity change occurs, the presence of such substance will have been established.

An important aspect of my present invention consists in the provision of stratified films of the class described in which there are numerous voids of molecular dimensions in the various film strata. Such film structures may be prepared by forming successive monolayers comprising two or more separable constituents and thereafter selectively abstracting one of such constituents to leave a molecular "skeleton film" or lattice.

For example, when a base member coated with a film of barium stearate which has been built at pH=6.5 is soaked for 1 to 10 seconds in benzene and is then withdrawn from the benzene, a striking change is observed in the interference color reflected by the film. The color of the soaked film corresponds to an optical thickness much less than that of the original film. Further soaking produces little or no change of color. The change is due to a large decrease in the refractive index of the film, the actual thickness being practically unaltered.

Before the film is soaked it consists of a mixture of barium stearate and stearic acid, the proportion of each component being determined by the barium concentration and pH of the water solution used in building up the film. The benzene dissolves the stearic acid and leaves the barium stearate as a skeleton with air filling the spaces previously occupied by the stearic acid.

The removal of 35 to 40 per cent of the material can be accomplished with practically no shrinkage in thickness of the film. In order to build a skeleton which will have a desired value of refractive index the proportion of the film that is to be dissolved is fixed by the stearic acid content of the film, this in turn being determined by the pH of the water bath. For example, by using a pH value of about 6.4, a film may be constructed which will lose about 36 per cent of its initial material when soaked in benzene. On the other hand, films built from a solution having practically the same barium content and pH equal to about 8 lose practically no material when soaked in benzene for one minute.

A factor which is significant in respect to the utility of skeleton films of the character referred to consists in the ability of such a film to absorb into its structural voids other substances. For example, the air spaces in the film may be filled with oil by allowing a drop of mineral oil to travel across the film. The oil does not wet the film permanently but withdraws from the path which it has traveled and this path is then seen to have the same color as that of the film before it was soaked in benzene. If a moderately volatile oil such as tetradecane or kerosene is used, the color gradually returns to that of the skeleton film as the oil evaporates.

From an optical standpoint the phenomenon just referred to may be utilized by heating various portions of a skeleton film permeated with a volatile impregnating medium to cause selective vaporization of the medium. Such vaporization will be accompanied by corresponding color changes in the selectively heated portions of the film as a result of local variations in refractive index.

Figs. 7 and 8 of the drawing illustrate a single monolayer of one of the novel films as it may be imagined to appear; first, with the intermolecular gaps filled with a volatile constituent and, second, after this constituent has been removed. It should be understood, however, that these figures are entirely diagrammatic, because the microscopic character of the molecular particles involved makes it impossible to obtain an exact picture of the molecular arrangement.

In Fig. 7 the rectangular elements 40 and 41 applied to the base member 42 may be considered to represent in a diagrammatic way the molecules of the volatile and the non-volatile components of the film. Prior to any heating of the film it possesses a refractive index which is a joint function of the refractive indices of the two film components. After heating, however, the film may be imagined to assume a form such as is indicated in Fig. 8, wherein the presence of voids or gaps 43 in the molecular structure reduces the effective refractive index of the film to a value below that of the solid film.

Practically, this feature may be employed in various ways in image reproduction devices. Thus, if the heating means comprises, for example, an invisible infra-red light image projected on the film a visible or photographically reproducible facsimile of such image will be produced on the film surface. Furthermore, under proper conditions, instantaneous variations in the infra-red light image may be made to cause similar variations in the film image.

Other media than infra-red light, such as cathode ray producing means, may also be used to stimulate the film. For this reason, the invention has an obvious application in the field of television.

Skeleton films of the class referred to also have many other uses which are independent of their optical properties. For example, such films may be employed as sieves or filters for the segregation of previously "non-filterable" substances of molecular magnitudes. It is only necessary for such filtration that the particles or molecules to be filtered be of a size greater than the dimensions of the molecular voids formed in the film structure.

While I have exemplified my invention chiefly by reference to films consisting of barium stearate, it should be understood that other films of widely varying character may be employed. For example, I may use alternatively barium arachidate, barium palmitate, calcium stearate, lead stearate, or such substances as chlorophyll and cholesterol. The principles of the invention are in fact independent of the materials employed, and I aim in the appended claims to cover films incorporating the novel characteristics disclosed herein without reference to their precise constitution or use.

What I claim as new and desire to secure by Letters Patent of the United States is:

1. As an article of manufacture a base member, and a stratified film thereon, each stratum of said film comprising a monolayer, and there being numerous voids of molecular dimensions in the structure of the separate strata.

2. In combination, a base member having a relatively smooth reflecting surface, and a stratified film thereon, each stratum of said film comprising a monomolecular layer in which similar molecules are similarly oriented, and there being numerous voids of molecular dimensions in the molecular structure of the separate strata, said film having a thickness of at least 900 Angstrom units.

3. In combination, a base member having a relatively smooth reflecting surface, and a stratified film thereon, each stratum of said film comprising a monomolecular layer in which similar molecules are similarly oriented and there being numerous voids of molecular dimensions in the molecular structure of the separate strata, said film having a thickness corresponding approximately to an integral number of quarter wave lengths of a selected monochromatic component of visible light.

4. In combination, a base member, and a stratified film thereon, each stratum of said film comprising a monomolecular layer in which similar molecules are similarly oriented, and there being gaps of molecular dimensions in the molecular structure of the separate strata, such gaps being filled with a substance which is more readily volatilized than said film and which differs in its refractive index from the material constituting the film whereby volatilization of said substance produces significant changes in the optical properties of the film.

5. The method which comprises applying to a base member successive monolayers comprising two or more separable constituents having their molecules in interspersed relationship, and selectively abstracting one of such constituents to leave a molecular lattice.

6. In combination, a base member, and a stratified film thereon having successively superimposed monolayers at least certain of said layers comprising two or more separable constituents having their molecules in interspersed relationship and at least one of the constituents being adapted to be selectively removed to leave numerous voids of molecular dimensions in the film structure.

KATHARINE B. BLODGETT.